United States Patent
Yang (10) Patent No.: US 11,693,225 B2
(45) Date of Patent: Jul. 4, 2023

(54) MONOCULAR TELESCOPE AND ADJUSTABLE OPTICAL MECHANISM THEREOF

(71) Applicant: Ching-Chou Yang, New Taipei (TW)

(72) Inventor: Ching-Chou Yang, New Taipei (TW)

( * ) Notice: Subject to any disclaimer, the term of this patent is extended or adjusted under 35 U.S.C. 154(b) by 273 days.

(21) Appl. No.: 17/213,166

(22) Filed: Mar. 25, 2021

(65) Prior Publication Data
US 2022/0308333 A1    Sep. 29, 2022

(51) Int. Cl.
*G02B 7/04*    (2021.01)
*G02B 23/16*   (2006.01)

(52) U.S. Cl.
CPC .............. *G02B 23/16* (2013.01); *G02B 7/04* (2013.01)

(58) Field of Classification Search
CPC ........ G02B 23/16; G02B 23/00; G02B 23/06; G02B 7/04; G02B 7/02
USPC .................................................. 359/425, 399
See application file for complete search history.

(56) References Cited

U.S. PATENT DOCUMENTS

| | | | | |
|---|---|---|---|---|
| 1,899,192 A * | 2/1933 | Gaertner | ............. | G02B 21/241 359/425 |
| 2,937,570 A * | 5/1960 | Hillman | ................. | G02B 23/00 359/426 |
| 3,051,045 A * | 8/1962 | Misuraca | ................. | G02B 7/28 359/425 |
| 4,632,547 A * | 12/1986 | Kaplan | .................. | G01C 15/00 359/399 |
| 6,466,367 B1 * | 10/2002 | Abe | .......................... | G02B 7/04 359/425 |
| 7,312,936 B2 | 12/2007 | Yen et al. | | |
| 2005/0099683 A1 * | 5/2005 | Mogamiya | ............. | G02B 23/12 348/E5.025 |
| 2010/0014160 A1 * | 1/2010 | Yang | ...................... | G02B 23/16 359/405 |

FOREIGN PATENT DOCUMENTS

TW    M343168 U    10/2008

* cited by examiner

*Primary Examiner* — William R Alexander
(74) *Attorney, Agent, or Firm* — Li & Cai Intellectual Property Office (57) ABSTRACT

A monocular telescope and an adjustable optical mechanism thereof are provided. The monocular telescope includes a housing module, a monocular module, and a camera. The housing module includes an outer tube assembled to the camera and a manipulation assembly that is assembled to the outer tube. The monocular module is movably assembled to the outer tube and includes an inner tube, a gear rack fixed to the inner tube and engaged with the manipulation assembly, and a plurality of optical lenses that are spacedly fixed in the inner tube and that jointly define a central optical axis. The manipulation assembly is configured to drive the gear rack to move the monocular module relative to the housing module along a direction parallel to the central optical axis back and forth, so that the camera can be allowed to focus a predetermined object.

10 Claims, 7 Drawing Sheets

FIG. 7 ically, but these components should not be limited by these terms. These terms are only used to distinguish one component from another component.

MONOCULAR TELESCOPE AND ADJUSTABLE OPTICAL MECHANISM THEREOF

FIELD OF THE DISCLOSURE

The present disclosure relates to a telescope, and more particularly to a monocular telescope and an adjustable optical mechanism thereof.

BACKGROUND OF THE DISCLOSURE

A conventional monocular telescope includes a monocular and a camera that is assembled to a distal end of the monocular, and the conventional monocular telescope is used to implement a focusing process by moving the camera. However, during the movement of the camera, the conventional monocular telescope is easily tilted due to the weight of the camera, so that focusing process is difficult to be accurately implemented by the conventional monocular telescope.

SUMMARY OF THE DISCLOSURE

In response to the above-referenced technical inadequacy, the present disclosure provides a monocular telescope and an adjustable optical mechanism thereof to effectively improve on the issues associated with conventional monocular telescopes.

In one aspect, the present disclosure provides a monocular telescope, which includes a housing module, a monocular module, and a camera. The housing module includes an outer tube and a manipulation assembly. The outer tube has an observation end and an assembling end that is opposite to the observation end. The manipulation assembly is assembled to the outer tube and is disposed between the observation end and the assembling end. The monocular module is movably assembled in the outer tube, and includes an inner tube, a gear rack, and a plurality of optical lenses. The inner tube has a first end and a second end that is opposite to the first end. The gear rack is fixed to the inner tube and is engaged with the manipulation assembly. The optical lenses are fixed in the inner tube and are spaced apart from each other. The optical lenses jointly define a central optical axis. The camera is fixed to the assembling end of the outer tube and is disposed adjacent to the second end of the inner tube. Moreover, a relative positioning of the camera and the outer tube is fixed. The manipulation assembly is configured to drive the gear rack to move the monocular module back and forth relative to the housing module along a direction parallel to the central optical axis, so as to allow the camera to focus a predetermined object.

In another aspect, the present disclosure provides an adjustable optical mechanism of a monocular telescope, which includes a housing module and a monocular module. The housing module includes an outer tube and a manipulation assembly. The outer tube has an observation end and an assembling end that is opposite to the observation end. The manipulation assembly is assembled to the outer tube and is disposed between the observation end and the assembling end. The monocular module is movably assembled in the outer tube, and includes an inner tube, a gear rack, and a plurality of optical lenses. The gear rack is fixed to the inner tube and is engaged with the manipulation assembly. The optical lenses are fixed in the inner tube and are spaced apart from each other. The optical lenses jointly define a central optical axis. The manipulation assembly is configured to drive the gear rack to move the monocular module back and forth relative to the housing module along a direction parallel to the central optical axis.

Therefore, the monocular module of the monocular telescope in the present disclosure can be adjusted in position relative to the camera through the cooperation between the gear rack and the manipulation assembly, so that the camera does not need to be moved, enabling the camera to accurately focus the predetermined object and allowing the camera used by the monocular telescope to have a heavier weight.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 7, an embodiment of the present disclosure provides a monocular telescope 100 that can be an astronomical telescope. In other words, any telescope provided without a monocular is different from the monocular telescope 100 of the present embodiment. As shown in FIG. 1 to FIG. 4, the monocular telescope 100 includes a housing module 1, a monocular module 2 movably assembled to the housing module 1, and a camera 3 that is fixed to the housing module 1.

It should be noted that the housing module 1 and the monocular module 2 in the present embodiment can be jointly defined as an adjustable optical mechanism. Moreover, the adjustable optical mechanism in the present embodiment is described in cooperation with the camera 3, but the present disclosure is not limited thereto. For example, in other embodiments of the present disclosure not shown in the drawings, the adjustable optical mechanism can be independently used (e.g., sold) or can be used in cooperation with other components.

Figure 1:
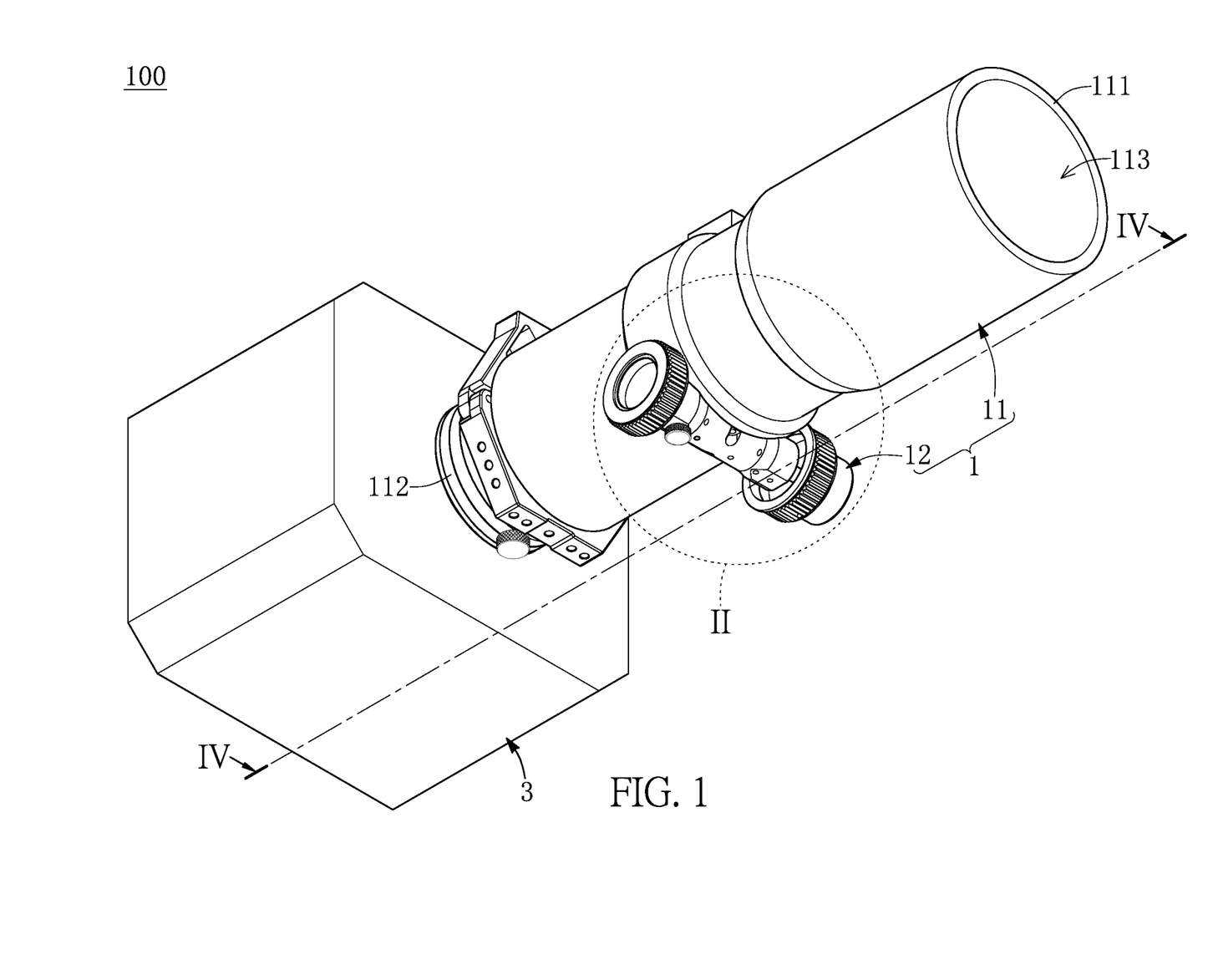
FIG. 1 is a perspective view of a monocular telescope according to an embodiment of the present disclosure.
Figure 2:
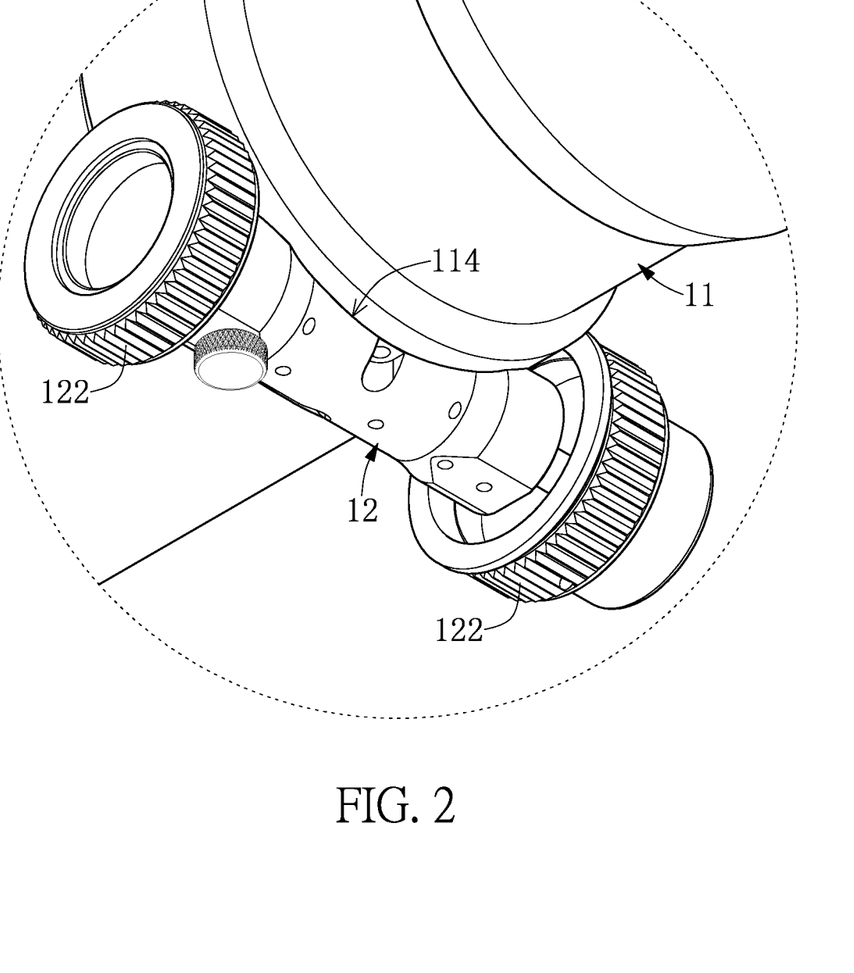
FIG. 2 shows an enlarged view of part II of FIG. 1.
Figure 3:
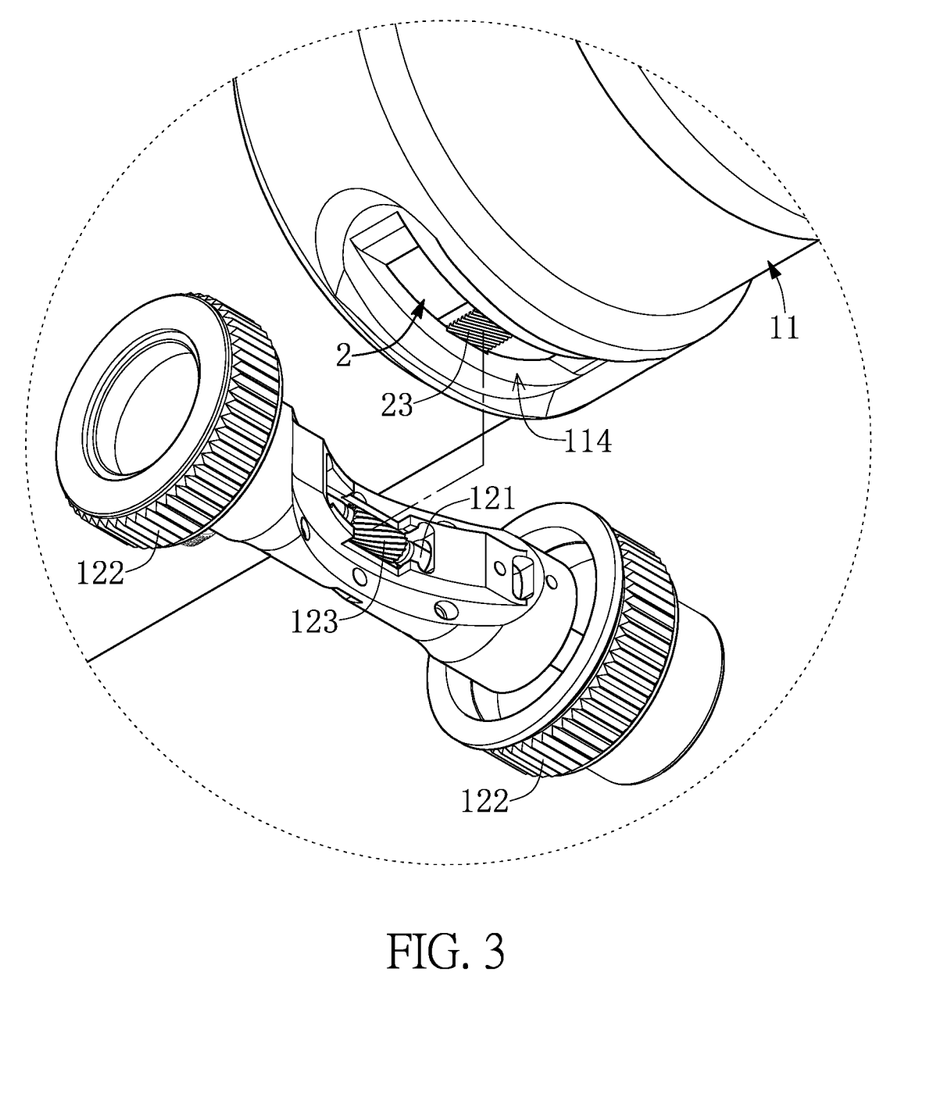
FIG. 3 is an exploded view of FIG. 2.
Figure 4:
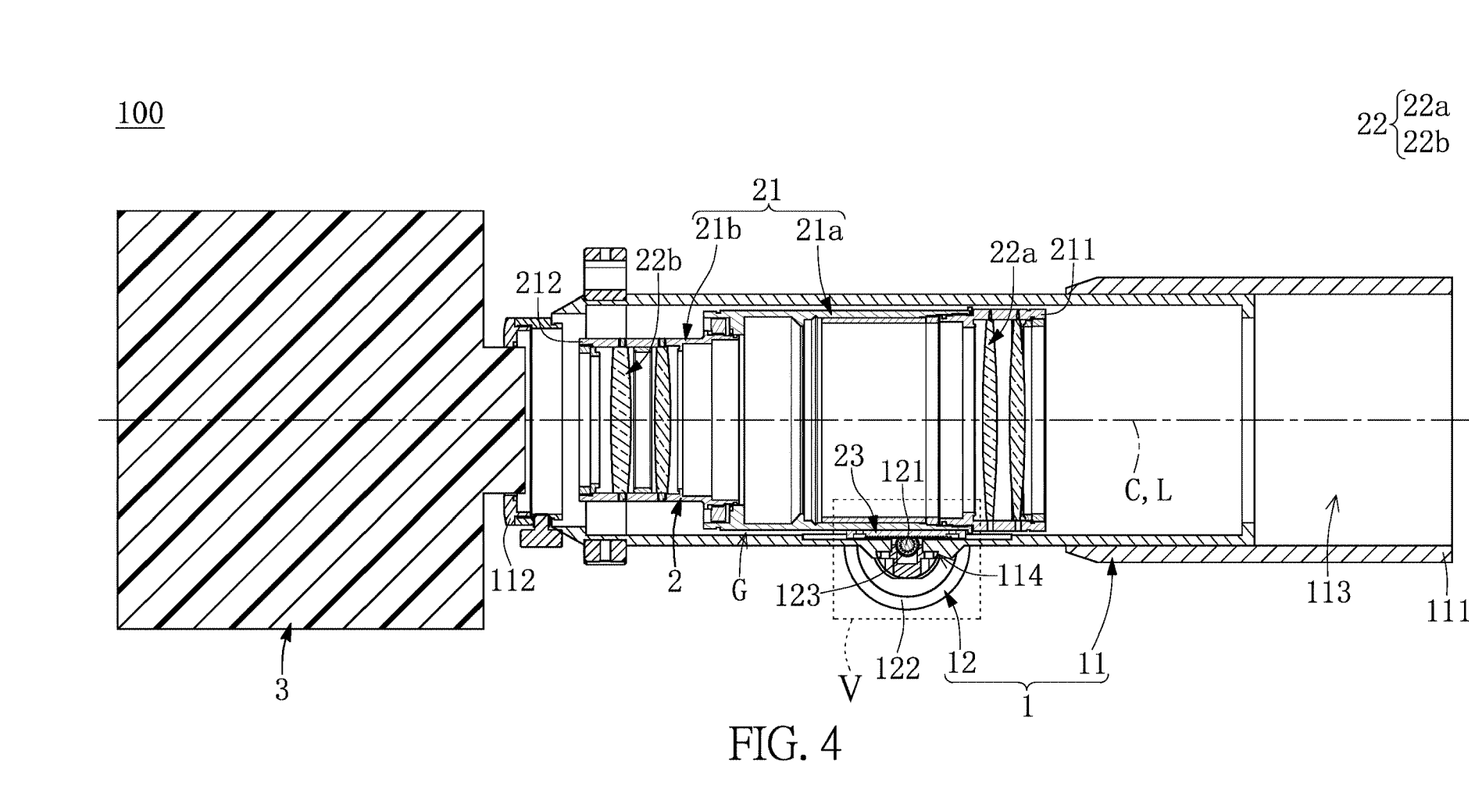
FIG. 4 is a cross-sectional view taken along line IV-IV of FIG. 1.
Figure 5:
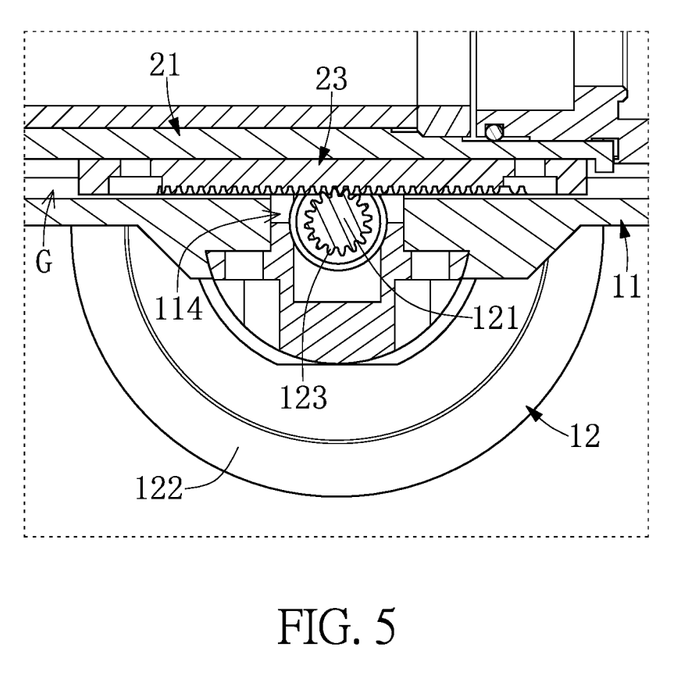
FIG. 5 shows an enlarged view of part V of FIG. 4.

As shown in FIG. 3 to FIG. 5, the housing module 1 includes an outer tube 11 and a manipulation assembly 12 that is assembled to an outer surface of the outer tube 11. The outer tube 11 in the present embodiment is substantially in a cylindrical shape and has (or defines) a central line L. In other words, any cross section of the outer tube 11 perpendicular to the central line L is in a circular ring shape having a center of a circle located at the central line L. Moreover, the outer tube 11 has an observation end 111 and an assembling end 112 that is opposite to the observation end 111, and an outer diameter of the observation end 111 is greater than an outer diameter of the assembling end 112.

Specifically, the outer tube 11 has a receiving slot 114 in spatial communication with an interior space 113 thereof. In other words, the interior space 113 of the outer tube 11 can be in spatial communication with an external space through the receiving slot 114. In the present embodiment, the receiving slot 114 is formed by penetrating through a portion of the outer tube 11 that is located at a substantial center position between the observation end 111 and the assembling end 112.

The manipulation assembly 12 is disposed between the observation end 111 and the assembling end 112. In other words, the portion of the outer tube 11 (e.g., the receiving slot 114) located at the substantial center position between the observation end 111 and the assembling end 112 is assembled with the manipulation assembly 12. In the present embodiment, the manipulation assembly 12 includes a rotation shaft 121 perpendicular to the central line L, and includes two manual knobs 122 that are respectively assembled to two opposite ends of the rotation shaft 121.

Specifically, the rotation shaft 121 has a plurality of gear teeth 123, and the gear teeth 123 are disposed around a substantial center segment of the rotation shaft 121 and are substantially arranged in the receiving slot 114. Moreover, at least one of the gear teeth 113 is arranged in the interior space 113 of the outer tube 11 by passing through the receiving slot 114. Any one of the two manual knobs 122 can be manipulated to spin the rotation shaft 121 so as to allow the gear teeth 123 to pass through the receiving slot 114 in turns.

The manipulation assembly 12 in the present embodiment is provided by using the two manual knobs 122 to be in cooperation with the rotation shaft 121, but the present disclosure is not limited thereto. For example, in other embodiments of the present disclosure not shown in the drawings, the manipulation assembly 12 can include the rotation shaft 121 and a semi-automatic mechanism that can be driven to spin the rotation shaft 121.

Figure 6:
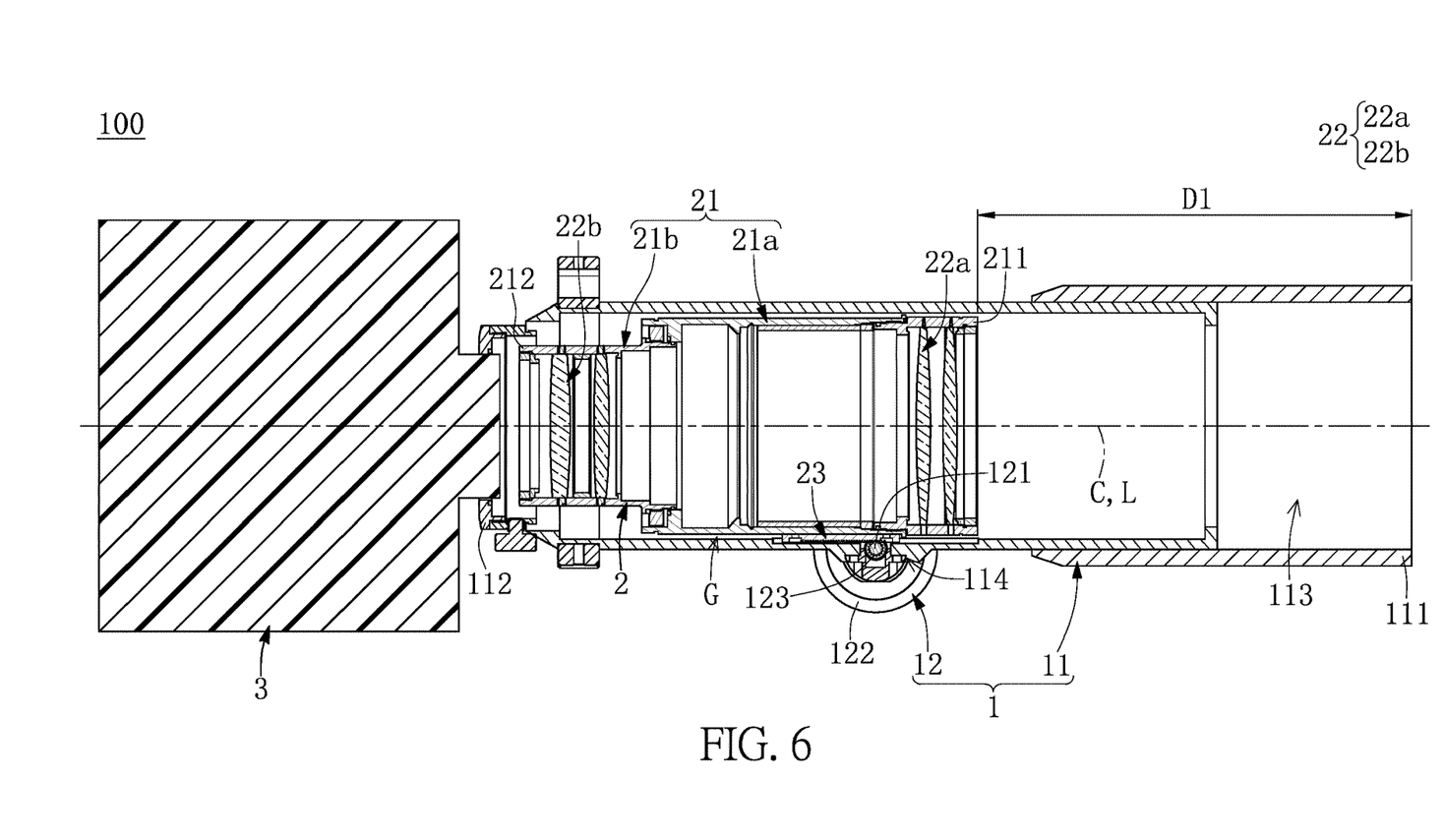
FIG. 6 is a cross-sectional view showing the monocular telescope of FIG. 4 when a monocular module is at a first position.
Figure 7:
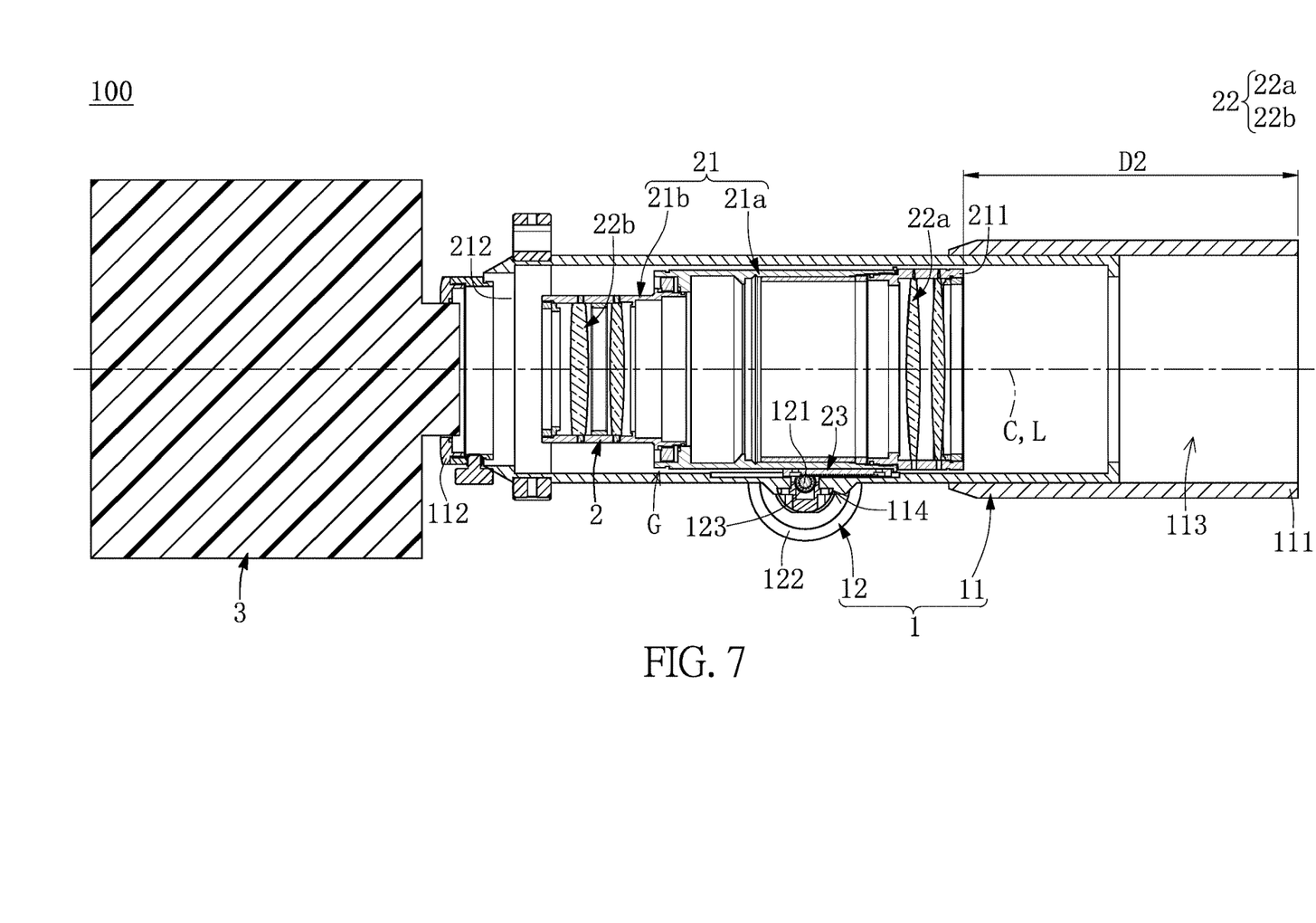
FIG. 7 is a cross-sectional view showing the monocular telescope of FIG. 4 when the monocular module is at a second position.

As shown in FIG. 3 to FIG. 5, the monocular module 2 is movably assembled in the outer tube 11, and is movable relative to the housing module 1 between a first position (as shown in FIG. 6) and a second position (as shown in FIG. 7) back and forth through being in cooperation with the manipulation assembly 12. The camera 3 is fixed to the assembling end 112 of the outer tube 11 and is located at the central line L. In the present embodiment, a relative positioning of the camera 3 and the outer tube 11 is fixed (e.g., the camera 3 is screwed to the outer tube 11), so that the monocular telescope 100 can be provided with the camera 3 having a heavier weight. For example, the weight of the camera 3 can be 20% to 45% of a sum of a weight of the housing module 1 and a weight of the monocular module 2; or, the weight of the camera 3 can be within a range from 2.5 kg to 4.5 kg, but the present disclosure is not limited thereto.

The monocular module 2 includes an inner tube 21 arranged in the outer tube 11, a plurality of optical lenses 22 fixed in the inner tube 21 and spaced apart from each other, and a gear rack 23 that is fixed to the inner tube 21 and that is engaged with the manipulation assembly 12. It should be noted that a relative positioning of the optical lenses 22 and the inner tube 21 in the present embodiment is fixed. Accordingly, the monocular telescope 100 in the present embodiment excludes any lens that is arranged therein and movable relative to a tube.

The inner tube 21 has a first end 211 and a second end 212 that is opposite to the first end 211, and the second end 212 is closer to the assembling end 112 than the first end 211. The inner tube 21 and the outer tube 11 have an annular gap G therebetween that is in spatial communication with the receiving slot 114. Moreover, a relative positioning of the optical lenses 22 is fixed (i.e., the optical lenses 22 cannot be moved relative to each other), and the optical lenses 22 in the present embodiment jointly define a central optical axis C overlapped with the central line L.

Specifically, the inner tube 21 in the present includes a first sub-tube 21a and a second sub-tube 21b that is connected to the first sub-tube 21a. Moreover, a first inner diameter of the first sub-tube 21a is different from a second inner diameter of the second sub-tube 21b (e.g., the first inner diameter is greater than the second inner diameter).

An end of the first sub-tube 21a arranged away from the second sub-tube 21b is defined as the first end 211, and an end of the second sub-tube 21b arranged away from the first sub-tube 21a is defined as the second end 212. In other words, the second sub-tube 21b is closer to the camera 3 than the first sub-tube 21a. It should be noted that a relative positioning of the first sub-tube 21a and the second sub-tube 21b in the present embodiment is fixed.

The optical lenses 22 are respectively fixed in the first sub-tube 21a and the second sub-tube 21b. Specifically, the optical lenses 22 include at least one first lens 22a fixed in the first sub-tube 21a and at least one second lens 22b that is fixed in the second sub-tube 21b. Moreover, a radius of the at least one first lens 22a is greater than a radius of the at least one second lens 22b.

Accordingly, the inner tube 21 in the present embodiment is provided with more than one sub-tube (e.g., the first sub-tube 21a and the second sub-tube 21b) to hold the optical lenses 22 having different radii, thereby allowing the monocular telescope 100 to be satisfied to different design requirements In addition, the inner tube 21 in the present embodiment includes the sub-tubes (e.g., the first sub-tube 21a and the second sub-tube 21b), but the present disclosure is not limited thereto. For example, in other embodiments of the present disclosure not shown in the drawings, the inner tube 21 can be integrally formed as a single one-piece structure, and the optical lenses 22 can have a same radius.

The gear rack 23 in the present embodiment is fixed to an outer surface of the inner tube 21 (e.g., the first sub-tube 21a) and is arranged in the annular gap G. The gear rack 23 is in an elongated shape, and a longitudinal direction of the gear rack 23 is parallel to the central optical axis C. The gear rack 23 corresponds in position to the receiving slot 114, so that at least one of the gear teeth 123 is engaged with the gear rack 23. Accordingly, the installation of the gear rack 23 utilizes the annular gap G between the inner tube 21 and the outer tube 11, so that the change range of the inner tube 21 and the outer tube 11 can be effectively reduced when the gear rack 23 is added into the monocular telescope 100.

Specifically, the manipulation assembly 12 is configured to drive the gear rack 23 (e.g., the two manual knobs 122 can be manipulated to drive the gear rack 23 through the rotation shaft 121) to move the monocular module 2 relative to the housing module 1 along a direction parallel to the central optical axis C back and forth, thereby allowing the camera 3 to focus a predetermined object (not shown in the drawings; e.g., a star). Accordingly, the monocular module 2 of the monocular telescope 100 can be adjusted in position relative to the camera 3 through the cooperation between the gear rack 23 and the manipulation assembly 12, so that the camera 3 does not need to be moved, enabling the camera to accurately focus the predetermined object.

When the monocular module 2 is at the first position (as shown in FIG. 6), the monocular module 2 is located adjacent to the camera 3 and is spaced apart from the observation end 111 by a first shielding depth D1 that is 40% to 50% of a length of the housing module 1. Moreover, when the monocular module 2 is at the second position (as shown in FIG. 7), the monocular module 2 is located away from the camera 3 and is spaced apart from the observation end 111 by a second shielding depth D2 that is 35% to 45% of the length of the housing module 1. The second shielding depth D2 is less than the first shielding depth D1. Accordingly, the monocular telescope 100 in the present embodiment is provided with the above structural cooperation between the outer tube 11 and the monocular module 2, so that during the movement of the monocular module 2, the outer tube 11 can provide enough light-shielding effect for facilitation of accurately focusing the predetermined object.

Beneficial Effects of the Embodiment

In conclusion, the monocular module of the monocular telescope in the present disclosure can be adjusted in position relative to the camera through the cooperation between the gear rack and the manipulation assembly, so that the camera does not need to be moved, facilitating accurate focusing of the predetermined object. Furthermore, the monocular telescope in the present disclosure can be provided with the camera having a heavier weight. For example, the weight of the camera can be 20% to 45% of the sum of the weight of the housing module and the weight of the monocular module.

Moreover, the installation of the gear rack of the monocular telescope in the present disclosure utilizes the annular gap between the inner tube and the outer tube, so that the change range of the inner tube and the outer tube can be effectively reduced when the gear rack is added into the monocular telescope.

In addition, the monocular telescope in the present disclosure is provided with the above structural cooperation between the outer tube and the monocular module (e.g., the first shielding depth is 40% to 50% of the length of the housing module, and the second shielding depth is 35% to 45% of the length of the housing module), so that during the movement of the monocular module, the outer tube can provide enough light-shielding effect to facilitate the accurate focusing of the predetermined object.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A monocular telescope, comprising:
   a housing module including:
      an outer tube having an observation end and an assembling end that is opposite to the observation end; and
      a manipulation assembly assembled to the outer tube and disposed between the observation end and the assembling end;
   a monocular module movably assembled in the outer tube and including:
      an inner tube having a first end and a second end that is opposite to the first end;
      a gear rack fixed to the inner tube and engaged with the manipulation assembly; and
      a plurality of optical lenses fixed in the inner tube and spaced apart from each other, wherein the optical lenses jointly define a central optical axis; and
   a camera fixed to the assembling end of the outer tube and disposed adjacent to the second end of the inner tube, wherein a relative positioning of the camera and the outer tube is fixed;
   wherein the manipulation assembly is configured to drive the gear rack to move the monocular module back and forth relative to the housing module along a direction parallel to the central optical axis, so as to allow the camera to focus a predetermined object;
   wherein the monocular module is movable relative to the housing module between a first position and a second position, wherein, when the monocular module is at the first position, the monocular module is located adjacent to the camera and is spaced apart from the observation end by a first shielding depth that is 40% to 50% of a length of the housing module, wherein, when the monocular module is at the second position, the monocular module is located away from the camera and is spaced apart from the observation end by a second shielding depth that is 35% to 45% of the length of the housing module, and wherein the second shielding depth is less than the first shielding depth.

2. The monocular telescope according to claim 1, wherein the inner tube and the outer tube have an annular gap therebetween, and the gear rack is arranged in the annular gap.

3. The monocular telescope according to claim 1, wherein the gear rack is in an elongated shape, and a longitudinal direction of the gear rack is parallel to the central optical axis.

4. The monocular telescope according to claim 1, wherein the manipulation assembly includes a rotation shaft perpendicular to the central optical axis and two manual knobs that are respectively assembled to two opposite ends of the rotation shaft, and wherein the rotation shaft has a plurality of gear teeth, and at least one of the gear teeth is engaged with the gear rack.

5. The monocular telescope according to claim 1, wherein a central line of the outer tube overlaps with the central optical axis, the camera is located at the central line, and a weight of the camera is 20% to 45% of a sum of a weight of the housing module and a weight of the monocular module.

6. The monocular telescope according to claim 1, wherein the inner tube includes:
   a first sub-tube having a first inner diameter, wherein the gear rack is fixed to an outer surface of the first sub-tube; and
   a second sub-tube connected to the first sub-tube and having a second inner diameter that is different from the first inner diameter;
   wherein the second sub-tube is closer to the camera than the first sub-tube, and the optical lenses are respectively fixed in the first sub-tube and the second sub-tube.

7. The monocular telescope according to claim 6, wherein the optical lenses include at least one first lens fixed in the first sub-tube and at least one second lens that is fixed in the second sub-tube, and wherein a radius of the at least one first lens is greater than a radius of the at least one second lens.

8. The monocular telescope according to claim 6, wherein a relative positioning of the optical lenses is fixed.

9. An adjustable optical mechanism of a monocular telescope, comprising:
   a housing module including:
      an outer tube having an observation end and an assembling end that is opposite to the observation end; and
      a manipulation assembly assembled to the outer tube and disposed between the observation end and the assembling end, wherein the outer tube is configured to allow a camera to be fixed to the assembling end thereof; and
   a monocular module movably assembled in the outer tube and including:
      an inner tube;
      a gear rack fixed to the inner tube and engaged with the manipulation assembly; and
      a plurality of optical lenses fixed in the inner tube and spaced apart from each other, wherein the optical lenses jointly define a central optical axis;
   wherein the manipulation assembly is configured to drive the gear rack to move the monocular module back and forth relative to the housing module along a direction parallel to the central optical axis;
   wherein the inner tube includes:
      a first sub-tube having a first inner diameter, wherein the gear rack is fixed to an outer surface of the first sub-tube; and
      a second sub-tube connected to the first sub-tube and having a second inner diameter that is different from the first inner diameter;
   wherein the second sub-tube is closer to the assembling end than the first sub-tube, and the optical lenses are respectively fixed in the first sub-tube and the second sub-tube.

10. A monocular telescope, comprising:
   a housing module including:
      an outer tube having an observation end and an assembling end that is opposite to the observation end; and
      a manipulation assembly assembled to the outer tube and disposed between the observation end and the assembling end;
   a monocular module movably assembled in the outer tube and including:
      an inner tube having a first end and a second end that is opposite to the first end;
      a gear rack fixed to the inner tube and engaged with the manipulation assembly; and
      a plurality of optical lenses fixed in the inner tube and spaced apart from each other, wherein the optical lenses jointly define a central optical axis; and
   a camera fixed to the assembling end of the outer tube and disposed adjacent to the second end of the inner tube, wherein a relative positioning of the camera and the outer tube is fixed;
   wherein the manipulation assembly is configured to drive the gear rack to move the monocular module back and forth relative to the housing module along a direction parallel to the central optical axis, so as to allow the camera to focus a predetermined object;
   wherein a central line of the outer tube overlaps with the central optical axis, the camera is located at the central line, and a weight of the camera is 20% to 45% of a sum of a weight of the housing module and a weight of the monocular module.

* * * * *